(12) United States Patent
Starkey

(10) Patent No.: US 10,715,464 B2
(45) Date of Patent: Jul. 14, 2020

(54) SYSTEM AND METHOD FOR MONITORING TOOLING ACTIVITIES

(71) Applicant: Progressive Components International Corporation, Wauconda, IL (US)

(72) Inventor: Glenn Starkey, Wauconda, IL (US)

(73) Assignee: PROGRESSIVE COMPONENTS INTERNATIONAL CORPORATION, Wauconda, IL (US)

( * ) Notice: Subject to any disclaimer, the term of this patent is extended or adjusted under 35 U.S.C. 154(b) by 94 days.

(21) Appl. No.: 16/122,503

(22) Filed: Sep. 5, 2018

(65) Prior Publication Data

US 2019/0007340 A1    Jan. 3, 2019

Related U.S. Application Data

(60) Division of application No. 13/648,931, filed on Oct. 10, 2012, now abandoned, which is a
(Continued)

(51) Int. Cl.
*G08B 23/00* (2006.01)
*H04L 12/931* (2013.01)
(Continued)

(52) U.S. Cl.
CPC .............. *H04L 49/00* (2013.01); *B29C 45/17* (2013.01); *B29C 45/1774* (2013.01); *G05B 19/406* (2013.01); *B29C 2045/1796* (2013.01)

(58) Field of Classification Search
CPC ............ B29C 2045/1796; B29C 45/17; B29C 45/1774; B29C 33/3857; B29C 33/424; B29C 33/565; G05B 19/406; H04L 49/00; H01L 2224/48091; H01L 2924/181; H01L 2924/00012; H01L 2924/00014;
(Continued)

(56) References Cited

U.S. PATENT DOCUMENTS 4,010,679 A    3/1977 Dybel
4,588,339 A    5/1986 Bila
(Continued)

FOREIGN PATENT DOCUMENTS

CN    1745355 A    3/2006
CN    101040735 A    9/2007
(Continued)

OTHER PUBLICATIONS

US 7,505,830 B2, 03/2009, Quail et al. (withdrawn)
(Continued)

*Primary Examiner* — Daniel Previl
(74) *Attorney, Agent, or Firm* — Pauley Erickson & Kottis

(57) ABSTRACT

An apparatus or system and method or process for displaying tool or die data or other tool or processing information on a display window of a webpage. A method for displaying tool data from a reciprocating tool includes positioning a monitor with respect to the reciprocating tool and the monitor recording data from the reciprocating tool. The data is communicated and then stored in a remote data storage location as stored tool data. The stored tool data is processed and then displayed, for example in the window of the webpage.

21 Claims, 15 Drawing Sheets

Related U.S. Application Data continuation-in-part of application No. 12/818,684, filed on Jun. 18, 2010, now Pat. No. 8,899,955, and a continuation-in-part of application No. 13/115,197, filed on May 25, 2011, now Pat. No. 8,883,054, which is a continuation-in-part of application No. 12/818,684, filed on Jun. 18, 2010, now Pat. No. 8,899,955.

(60) Provisional application No. 61/268,957, filed on Jun. 18, 2009, provisional application No. 61/545,394, filed on Oct. 10, 2011.

(51) Int. Cl.
  *B29C 45/17* (2006.01)
  *G05B 19/406* (2006.01)

(58) Field of Classification Search
  CPC ........ H01L 2224/48247; H01L 31/167; C25D 11/045; C25D 11/16; C25F 3/20; G02B 1/118
  USPC ..... 340/500, 521, 525, 524, 538.15, 539.22, 340/545.7, 545.8, 545.9, 568.8, 686.5, 340/691.6
  See application file for complete search history.

(56) References Cited

U.S. PATENT DOCUMENTS

| | | | |
|---|---|---|---|
| 4,588,880 | A | 5/1986 | Hesser |
| 4,654,512 | A | 3/1987 | Gardosi |
| 4,674,053 | A | 6/1987 | Bannai et al. |
| 4,720,907 | A | 1/1988 | Rapp |
| 4,742,470 | A | 5/1988 | Juengel |
| 4,809,426 | A | 3/1989 | Takeuchi et al. |
| 4,821,198 | A | 4/1989 | Takeuchi et al. |
| 4,856,177 | A | 8/1989 | Takeuchi et al. |
| 4,890,306 | A | 12/1989 | Noda |
| 4,942,534 | A | 7/1990 | Yokoyama et al. |
| 4,964,144 | A | 10/1990 | Uchida et al. |
| 5,005,277 | A | 4/1991 | Uemura et al. |
| 5,057,000 | A | 10/1991 | Mangone, Jr. |
| 5,222,026 | A | 6/1993 | Nakamoto |
| 5,257,199 | A | 10/1993 | Tsujino et al. |
| 5,344,301 | A | 9/1994 | Kamiguchi et al. |
| 5,374,231 | A | 12/1994 | Obrist |
| 5,556,582 | A | 9/1996 | Kazmer |
| 5,565,854 | A | 10/1996 | Kataoka et al. |
| 5,571,539 | A | 11/1996 | Starkey |
| 5,692,998 | A | 12/1997 | Weigel |
| 5,787,018 | A | 7/1998 | Bolan et al. |
| 5,795,511 | A | 8/1998 | Kalantzis et al. |
| 5,811,134 | A | 9/1998 | Takizawa |
| 6,051,170 | A | 4/2000 | Kamiguchi et al. |
| 6,072,146 | A | 6/2000 | Matuschek et al. |
| 6,145,022 | A * | 11/2000 | Takizawa ................ B29C 45/76 700/200 |
| 6,272,398 | B1 | 8/2001 | Osborne |
| 6,360,136 | B1 | 3/2002 | Lamers |
| 6,377,649 | B1 * | 4/2002 | Stuart ................ B29C 45/17 377/15 |
| 6,381,512 | B1 | 4/2002 | Saitou et al. |
| 6,529,796 | B1 | 3/2003 | Kroeger et al. |
| 6,585,628 | B1 | 7/2003 | Tsung et al. |
| 6,848,895 | B2 | 2/2005 | Konishi et al. |
| 7,010,898 | B2 | 3/2006 | Michel |
| 7,128,548 | B2 | 10/2006 | Männer |
| 7,311,136 | B2 * | 12/2007 | Manner ................ B29C 45/17 164/312 |
| 7,431,682 | B2 | 10/2008 | Zeiler et al. |
| 7,480,542 | B2 | 1/2009 | Kroeger et al. |
| 7,580,771 | B2 | 8/2009 | Quail et al. |
| 8,025,496 | B2 | 9/2011 | Eikenberry |
| 8,047,746 | B2 | 11/2011 | Olsson |
| 9,239,938 | B2 | 1/2016 | Weider et al. |
| 2003/0072831 | A1 | 4/2003 | Poynor |
| 2003/0082255 | A1 | 5/2003 | Konishi et al. |
| 2004/0093114 | A1 * | 5/2004 | Magario ................ B29C 45/76 700/197 |
| 2004/0121034 | A1 | 6/2004 | McBain |
| 2004/0247724 | A1 * | 12/2004 | Manner ................ B29C 45/76 425/149 |
| 2005/0102300 | A1 | 5/2005 | Madsen |
| 2005/0240303 | A1 * | 10/2005 | Smith ................ B29C 45/80 700/200 |
| 2005/0283271 | A1 * | 12/2005 | Dachs ................ G05B 19/0426 700/200 |
| 2006/0129268 | A1 * | 6/2006 | Conner ................ B29C 45/17 700/174 |
| 2007/0000154 | A1 | 1/2007 | DiBenedetto et al. |
| 2007/0009627 | A1 | 1/2007 | Konishi |
| 2007/0066139 | A1 | 3/2007 | Roeper et al. |
| 2008/0178111 | A1 | 7/2008 | Childress et al. |
| 2009/0055029 | A1 * | 2/2009 | Roberson ................ E21B 47/00 700/282 |
| 2009/0058708 | A1 * | 3/2009 | Park ................ G08C 19/28 341/176 |
| 2009/0265958 | A1 | 10/2009 | DiBenedetto et al. |
| 2010/0050478 | A1 | 3/2010 | DiBenedetto et al. |
| 2010/0242616 | A1 | 9/2010 | Waser |
| 2010/0320632 | A1 | 12/2010 | Starkey |
| 2011/0316180 | A1 | 12/2011 | Starkey |
| 2013/0103794 | A1 | 4/2013 | Starkey |
| 2014/0225292 | A1 | 8/2014 | Starkey |
| 2015/0151472 | A1 | 6/2015 | Starkey |

FOREIGN PATENT DOCUMENTS

| | | |
|---|---|---|
| DE | 35 18902 A1 | 11/1986 |
| DE | 39 19 699 A1 | 1/1991 |
| DE | 10 2004 052 499 A1 | 7/2006 |
| DE | 10 2006 009 947 A1 | 9/2007 |
| DE | 10 2006 020 446 A1 | 11/2007 |
| EP | 0 155 662 A2 | 9/1985 |
| EP | 0 365 760 A2 | 5/1990 |
| EP | 0 881 552 A2 | 12/1998 |
| EP | 1 287 959 A2 | 3/2003 |
| EP | 1 369 811 A1 | 12/2003 |
| EP | 1 486 312 A1 | 12/2004 |
| EP | 1 927 912 A1 | 6/2008 |
| EP | 2 045 067 A2 | 4/2009 |
| GB | 2 161 958 A | 1/1986 |
| GB | 2 336 331 A | 10/1999 |
| GB | 2 426 849 A | 12/2006 |
| GB | 2435189 B | 8/2007 |
| JP | 58-102650 | 6/1983 |
| JP | 60-018870 | 1/1985 |
| JP | 60-127950 | 7/1985 |
| JP | 60-127951 | 7/1985 |
| JP | 61-114831 | 6/1986 |
| JP | 62-015058 | 1/1987 |
| JP | 62-193738 | 8/1987 |
| JP | 63-144934 | 6/1988 |
| JP | 63-185546 | 8/1988 |
| JP | 03-166030 | 7/1991 |
| JP | 4-212826 | 8/1992 |
| JP | 5-116129 | 5/1993 |
| JP | 5-91811 | 12/1993 |
| JP | 5-345343 | 12/1993 |
| JP | 06-004549 | 1/1994 |
| JP | 06-031529 | 2/1994 |
| JP | 06-328458 | 11/1994 |
| JP | 7-152821 | 6/1995 |
| JP | 8-132502 | 5/1996 |
| JP | 2003-1686 | 1/2003 |
| JP | 2003-001688 | 1/2003 |
| JP | 2003-94487 | 4/2003 |
| JP | 2003-200456 | 7/2003 |
| JP | 2003-266498 A | 9/2003 |
| JP | 2004-164027 | 6/2004 |
| JP | 2004-167962 | 6/2004 |
| JP | 2006-026865 | 2/2006 |
| JP | 2007-160642 | 6/2007 |

(56) References Cited

FOREIGN PATENT DOCUMENTS

| | | |
|---|---|---|
| JP | 4688445 | 2/2011 |
| KR | 199708249 B1 | 11/1993 |
| KR | 10-0552951 B1 | 2/2006 |
| KR | 10-2009-0004791 | 1/2009 |
| KR | 10-2009-0100973 | 9/2009 |
| WO | WO 92/11102 | 7/1992 |
| WO | WO99/01806 | 1/1999 |
| WO | WO 00/79403 A2 | 12/2000 |
| WO | WO 02/40224 | 5/2002 |
| WO | WO 02/40247 A1 | 5/2002 |
| WO | WO 02/47215 A1 | 6/2002 |
| WO | WO 03/071880 A2 | 9/2003 |
| WO | WO 03/081379 A2 | 10/2003 |
| WO | WO 2004/051857 A2 | 6/2004 |
| WO | WO 2005/001741 A1 | 1/2005 |
| WO | WO 2006/009155 A1 | 1/2006 |
| WO | WO 2006/108978 A2 | 10/2006 |
| WO | WO 2009/052641 | 4/2009 |
| WO | WO 2010/148278 A2 | 12/2010 |

OTHER PUBLICATIONS

MACO 8000 VA—Plastics Manufacturing Control System, pp. 1-11, May 1991.
Mold-Stick, Meusburger EUR 2009, Meusburger Georg GmbH & Co. KG, 2009, 4 pages.
Meusberger inForms Customers & Partners; Magazine for Customers & Partners, Jun. 2009, www.meusberger.com, 4 pages.
Chinese Search Report (2 pages) and Fang Xinqing, Notification of the First Office Action, dated Aug. 29, 2013, CCPIT Patent and Trademark Law Office, Beijing, China (11 pages).
Cumsa Price List, "Cycle Counter (CC)", www.cumsa.com, Barcelona, Spain, Jan. 2000 (3 pages).
Form PCT/ISA/237, Written Opinion of the International Searching Authority, Baek, Yang Gyu, Korean Intellectual Property Office, Metropolitan City, Republic of South Korea, dated Mar. 19, 2013 (4 pages).
Anonymous, "Mould Analyzer—Product Information", Apr. 16, 2009 Gammaflux Europe GmbH, Wiesbaden Germany, http://sv.interdrive.dk/userfiles/file/Nyheds pdf/Mould AnalyzerFlyer Engl 300.pdf (retrieved Nov. 19, 2014).
Anonymous, "MOLDMIND", Mar. 1, 2005, pp. 1-6, Otto Männer Vertriebs GmbH, Bahlingen, Germany, http://www.maenner-group.com/html/seiten/output_adb_file.php?id=4359 (retrieved Nov. 18, 2014).
Anonymous, "D-M-E Counterview Precisely Monitors Mold Operation, Validates Data", NF Corporation, http://news.thomasnet.com/fullstory/mold-counter-monitors-mold-operation-and-validates-data-561781 (retrieved on Nov. 20, 2014).
European Patent Office, Form 1503—Supplementary European Search Report with Form 1703—European Search Opinion for EP 10 79 0243, dated Dec. 2, 2014, Munich, Germany (11 pages total).
European Patent Office, Form 1503—Supplementary European Search Report with Form 1703—European Search Opinion for EP 12 789 547, dated Feb. 10, 2015, Munich, Germany (7 pages total).
European Patent Office, Form 1503—Supplementary European Search Report with Form 1703—European Search Opinion for EP 12 83 9570, dated Mar. 6, 2015, Munich, Germany (9 pages total).
Geppert, E. et al., "Werkzeug-Prozessdaten-Protokollierung Flugschreiber Fürs Werkzeug", Plastverarbeiter, 2005, v. 56,nr. 4, pp. 78-79 http://plastverarbeiter.de/ai/resources/bf6ee9ae0d0.pdf.
EPO, Communication pursuant to Article 94(3) EPC (EPO Form 2001 & EPO Form 2906) for EP 12 839 570.4-1014, dated Jun. 18, 2019, Munich, Germany (10 pages total).
Anonymous: "Machine controls, production monitoring," Plastics Today, Aug. 31, 2003, XP055593657, URL: https://www.plasticstoday.com/content/machine-controls-production-monitoring/3458593292519 (retrieved Jun. 3, 2019) 9 pages.
Anonymous: "Remote monitor system," iPAQET, Toshiba Machine, Sep. 30, 2011, XP055593656, URL: https://www.toshiba-machine.co.jp/en/product/shashutsu/lineup/control/ipaqet.html (retrieved Jun. 3, 2019) 3 pages.
Toshiba Machine Co., Ltd., "Overview of EC-S/SX Series—Best Partner of Leading Industries," Oct. 31, 2009, XP055593661, URL: http://www.kootautomation.nl/koot/upload/pdf/ec-sx-presentatie.pdf (retrieved Jun. 3, 2019) 17 pages.
China Patent Office, "Notice of Third Office Acton," for Chinese Patent Application 201280043507.4, dated Jun. 24, 2019, Shanghai, China (10 pages).

* cited by examiner

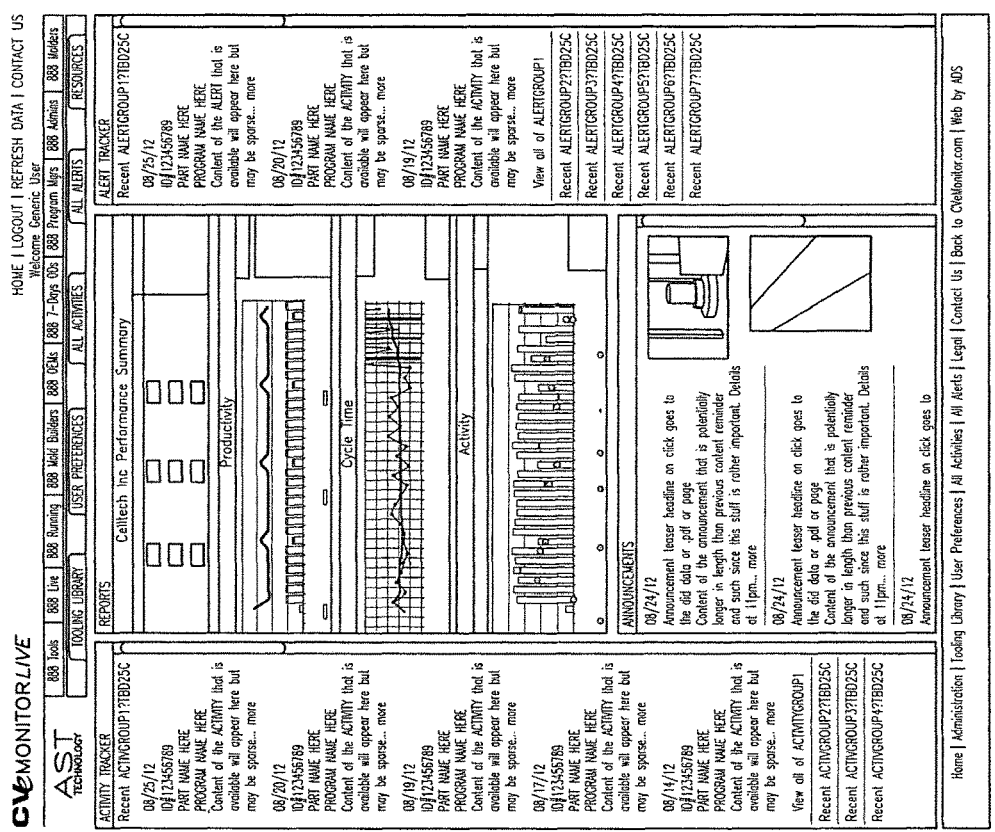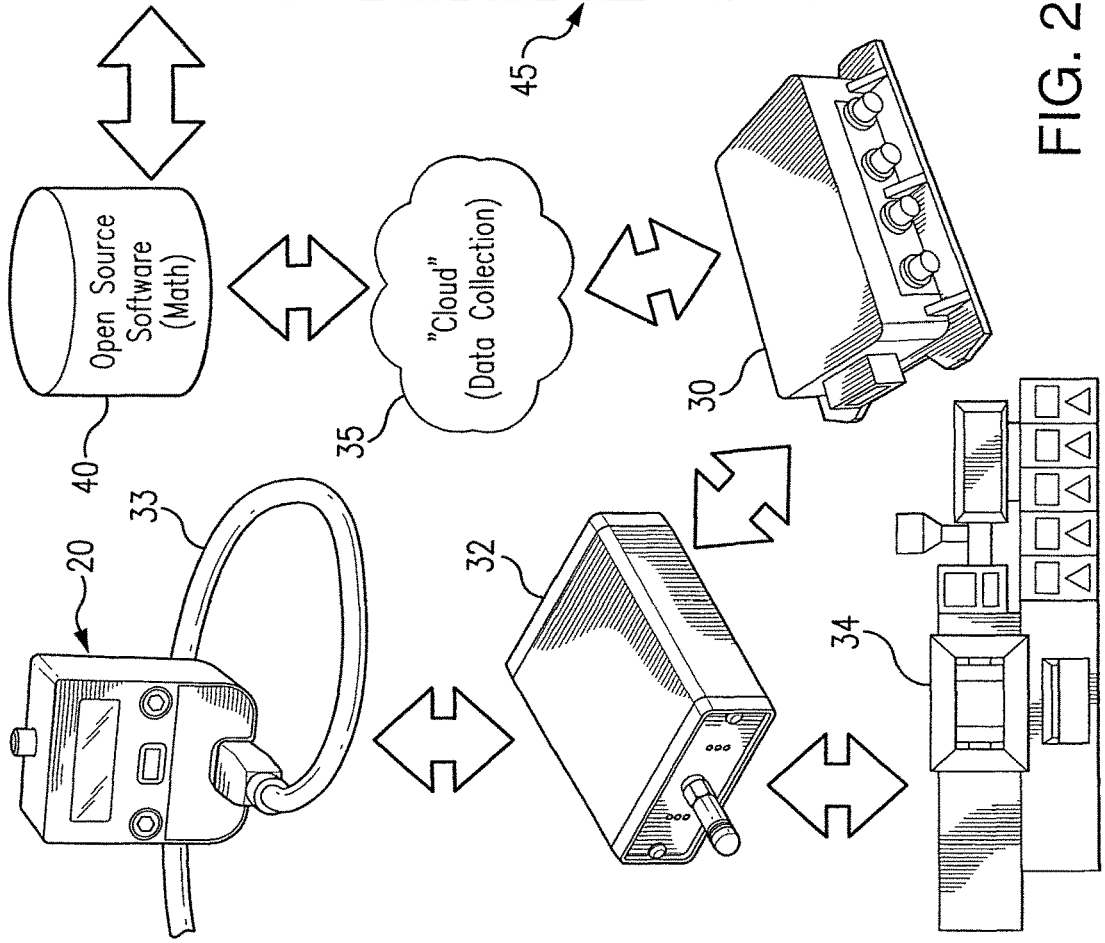
FIG. 2

VIEW ALL TOOLS

Below is a list of all tools registered to the administrator's company that you have access to view. Click on the column heading to sort the records according to that field.

To call up a specific record, click on the link within the Tool ID column.

Tools for Big Molded Products

Each Column can be sorted

| Device ID | Tool ID | Part ID | Part Name | Cavs | Engineer | Tool Type | Tool Bldr | Processor | Status |
|---|---|---|---|---|---|---|---|---|---|
| OHX0223 | 1038 | 121255 | Tube | 8 | Sam Johnson | Production | Michigan Tool | Diamond Plastics | Obsole |
| OHX0224 | 1078-ND | 110654 | Door | 4 | Sam Johnson | Prototype | Michigan Tool | ND Plastics | Active |
| OHX0225 | 1097-ND | 125813 | Bezel | 2 | Sam Johnson | PROTOTYPE | MG Tooling | ND Plastics | Unavai |
| OHX0226 | 1186-ND | 101065 | Cap | 4 | Bob Smith | Production | Pro Tools | ND Plastics | Active |
| OHX0227 | 1188 | 108793 | Retainer | 1&1 | Bob Smith | Production | Pro Tools | Diamond Plastics | Destro |
| OHX0228 | 1186-ND | 122498 | Clip | 4 | Bob Smith | Production | MG Tooling | ND Plastics | Active |
| OHX0229 | 1402 | 111587 | Strap | 4 | Joe Brown | Production | Pro Tools | Diamond Plastics | Active |
| OHX0230 | A123456 | 564688 | Brown Clip | 4 | D. Springer | Production | Tom's Mold Works | Big Molded Products | Active |
| OHX0231 | AL-108-DFS | 124789 | Base | 2 | Joe Brown | Production | MG Tooling | Alfa Molding | Active |
| OHX0232 | AL-1102 | 123356 | Cover | 2 | Bob Smith | Production | MG Tooling | Alfa Molding | Active |
| OHX0233 | AL-1122 | 108741 | Handle | 16 | Bob Smith | Production | Michigan Tool | Alfa Molding | Active |
| OHX0234 | AL-2259 | 112233 | Stand | 4 | Sam Johnson | Prototype | Michigan Tool | Alfa Molding | Active |
| OHX0235 | BMP-1225 | BEZ-233k5 | BEZEL | 16 | Brian Thomas | Production | Tom's Mold Works | Advantage Molding | Active |

TOOLS
- New Tool
- Search Tools
- View All
- View Archived

USERS
- Add User
- Edit User
- Delete User

USERS
- Add Admin
- Edit Admin
- Delete Admin

AST TECHNOLOGY

Exception Reporting

| Moulder | Part ID | Mould ID | Device ID | Days Since Last Connection | Total Cycles | Compared to last month | Quantity of Tools with Exceptions | Compared to last Month | Target | Cycle Time Current | Cycle Time Last Week | LTD | Target | Activity Percentage Current | Activity Percentage Last Week | LTD | QTY of PM | Qty of General Query | Qty of Part Rev | Qty of Repair Pulls |
|---|---|---|---|---|---|---|---|---|---|---|---|---|---|---|---|---|---|---|---|---|
| ABC Moulding | 78-8056-9799-8 | 276 | OGM0047 | 12 | 1,531,053 | | | 14.4 | | | 14.0 | 96.0% | 94.0% | 94.2% | 94.0% | 12 | 46 | 2 | 0 |
| ABC Moulding | 78-8056-9799-15 | 287 | OGM0053 | 4 | 1,294,395 | O | 2 | 25.8 | 16.9 | 25.1 | 97.0% | 97.0% | 99.0% | 98.2% | 9 | 58 | 0 | 1 |
| XYZ Products | 1531064477-A | 42881 | OGM0018 | 18 | 69,023 | | | 118.5 | | 114.3 | 98.0% | 99.8% | 99.8% | 98.3% | 1 | 1 | 0 | 0 |
| XYZ Products | 1531064482-A | 42889 | OGM0026 | 25 | 132,789 | ⇨ | 0 | 17.5 | | 15.5 | 98.0% | 99.8% | 99.8% | 99.0% | 2 | 3 | 0 | 0 |
| XYZ Products | 1531064483-B | 42903 | OGM0029 | 15 | 1,718,310 | | | 8.9 | 8.9 | 8.6 | 98.0% | 99.9% | 98.1% | 98.3% | 14 | 46 | 1 | 1 |
| XYZ Products | 1531064462-A | 42879 | OGM0014 | 24 | 1,264,511 | | 1 | 18.2 | 17.6 | 15.9 | 93.0% | | | 93.3% | 12 | 52 | 0 | 0 |
| ABC Moulding | 78-8056-9799-5 | 269 | OGM0049 | 26 | 240,961 | | 2 | 184.0 | 188.5 | 174.5 | 95.0% | | | 94.7% | 3 | 8 | 0 | 0 |

Performance Alerts: Compared=Compared to last month; Exception=Faster Cycle Time; Exception=Slower Cycle Time; Exception=Activity % Variance Repair/Maintenance Activity: Quantity of Unscheduled Mould Stoppage; Compared to last month

Summary by Moulder

| Moulder | Mould Information Quantity of Tools in Program | Last Connection= More Than 28 days Ago |
|---|---|---|
| ABC Moulding | 22 | 1 |
| XYZ Products | 21 | 2 |
| Totals | 43 | 3 |

PROGRAM WATCH
OEM: ABC Part Specialties
Program: Mocha
Quantity of Tools: 43

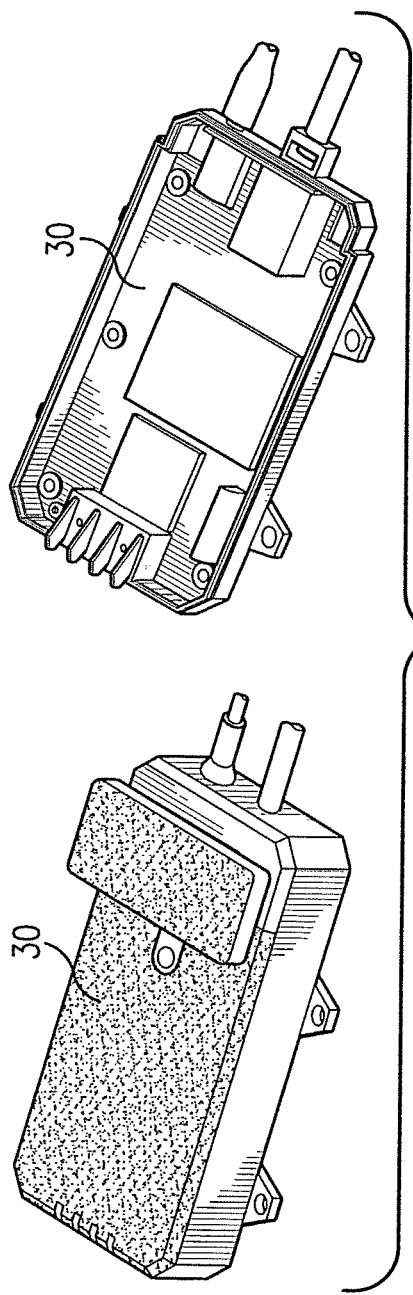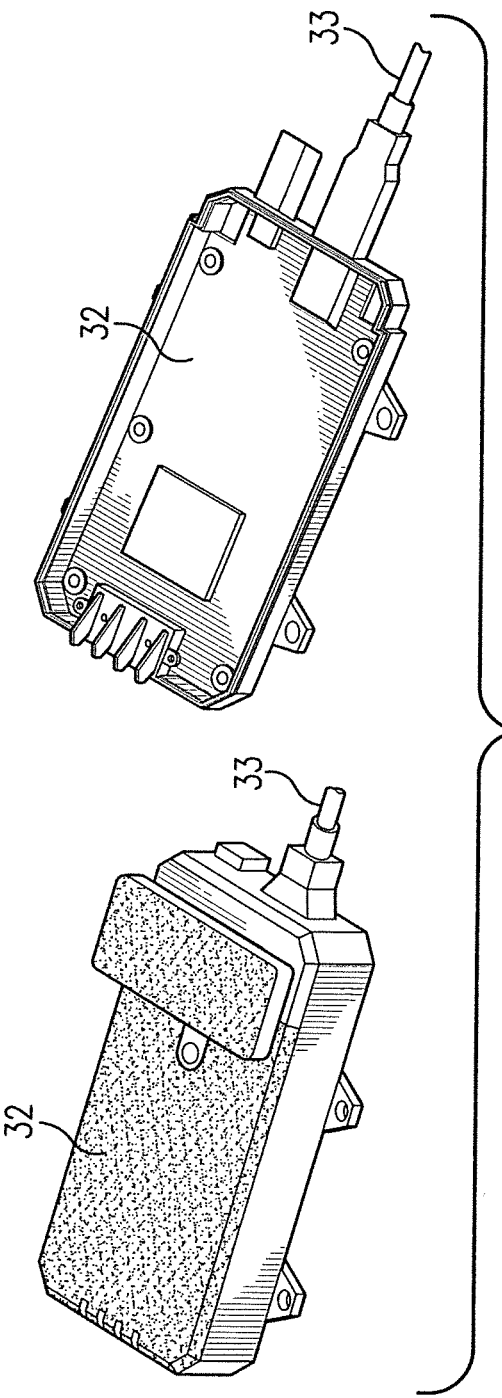
FIG. 11
FIG. 12 eDART Configuration

Time Zone: ☑ Use Daylight Savings
(UTC-2500) Eastern, (USA, Canada) ▽
☐ Enable screen saver after [20] min.

Startup language: [US English] ▽
☐ Enable Virtual Keyboard
Keyboard layout: [US English] ▽

☐ Copy files up to [192.168.2.6]
 FTP server at:
User Name: [rjgftp]
Password: [password]
Path on Server: [ ]

Hours: Min of the day [3] : [15]
at which to do backups eDART Group: [LOBBY]
(for cross-copy of setups)

eDART Serial Number: [ ]

[Save]

IP Address: [192.168.5.174]
IP Address: [255.255.0.0]
Default Gateway: [192.168.2.54]

[Change Node Number]

☐ Use Network Time Server at
 Additional Network Gateways...
☐ Block network traffic not addressed to this eDART ☑ Enable Direct File Access from Windows
Description on Network: [edart6]
Windows Workgroup: [INSIGHT]

Serial Port Function Setup:
| | | Port | IRQ |
|---|---|---|---|
| Com1 | Lynx ▽ | 3F8 | 4 |
| Com2 | Lynx ▽ | 2F8 | 3 |
| Com3 | Modem ▽ | 3E8 | 10 |
| Com4 | None ▽ | 2E8 | 5 |

Lynx
Modem
Touch Screen Smartset
Touch Screen Intellitouch
None

[Cancel]

FIG. 14

SYSTEM AND METHOD FOR MONITORING TOOLING ACTIVITIES

CROSS REFERENCE TO RELATED APPLICATION

This Patent Application is a Divisional of co-pending U.S. patent application Ser. No. 13/648,931, filed 10 Oct. 2012, which claims the benefit of U.S. Provisional Application Ser. No. 61/545,394, filed 10 Oct. 2011 and U.S. Provisional Application Ser. No. 61/268,957, filed 18 Jun. 2009. U.S. patent application Ser. No. 13/648,931 is also a Continuation-In-Part of U.S. patent application Ser. No. 12/818,684, filed 18 Jun. 2010 and U.S. patent application Ser. No. 13/115,197, filed 25 May 2011, which is a Continuation-In-Part of U.S. patent application Ser. No. 12/818,684, filed 18 Jun. 2010, which claims the benefit of U.S. Provisional Application Ser. No. 61/268,957, filed 18 Jun. 2009.

BACKGROUND OF THE INVENTION

Field of the Invention

This invention relates to a system or device and process or method for accessing data or information from and/or about a production tool or stamping, such as an injection mold or stamping, communicating the acquired data or information to an infrastructure or system that calculates and/or processes the data or information and delivers desired results to a display device that can be viewed, as allowed by assigned rights, by an end user.

Discussion of Related Art

Companies that currently process injection molds and stamping dies have known systems for tracking their tools, such as manual log books and files. Other companies have developed in-house systems, for example by using a conventional spreadsheet application, such as Microsoft® Excel® or a system developed in or by Microsoft® Access®. For tooling information, some companies use a Process Monitoring System which may have some tool data storage capabilities, and some companies may have an Enterprise Resource Planning (ERP) system which can manage assets, for example, assets associated with tooling.

Manual log books are still commonly used to maintain tooling information. Some companies may have internally developed systems, some of which may be electronic, but internally developed systems are typically not highly developed and thus produce only basic reports. Process Monitoring Systems, such as IQMS, Mattec, and the like, and ERP systems, such as PlantStar, SAP, and the like, do not effectively manage tool activity or preventive maintenance (PM) scheduling. Conventional systems do not communicate or talk with each other to share tooling information, possibly only relating press information. However, some conventional systems, such as described at ProFileCV.com and by MoldTrax, address some tooling industry needs.

Regardless of how tooling information is managed within a processing company, the tooling information is often confidential information or proprietary information to the particular original equipment manufacturer (OEM) or processing company and often contains information and/or data that is otherwise unavailable to the public, particularly to any person outside of the processing company. For example, a tool builder or tool making company can design and build a tool and generate tool drawings, and a processor can produce parts and supply the parts to an OEM. Sometimes, for example, a processor is unable to locate tool drawings to replace a broken tool component and the processor experiences downtime. Sometimes the actual performance cycle times of the tool are withheld or kept from the OEM by its processor in order to not share profitability with the OEM customer. Also, lack of timely reporting can result in a lack of accountability of proper PM and thus downtime of the tool. Any tool downtime can impact the owner's or the OEM's supply chain management and thus negatively impact the OEM's supply of its end product to the marketplace.

Information about the tool, such as drawings or revisions, as well as the actual performance activity and maintenance records, currently are often withheld or locked within the various supplier locations and thus are not readily available to business decision-makers, such as tooling managers at OEMs. Ironically, about 30-40 years ago the OEM, the processor and the tool maker shared more tooling information and thus were more connected than they are now, even with current enhanced computing and connectivity technologies, which is somewhat due to global supply chains now reaching worldwide, as well as recent trends in reducing the depth of technical staff at OEMs and Tier 1 companies.

SUMMARY OF THE INVENTION

In some embodiments according to this invention, a monitoring device is mounted on or with respect to an injection mold, for example, as used by a processor for making production parts. A monitoring device according to this invention can use a cable, a wire or another suitable hardware component, for example, with a USB port, and/or can use any wireless communication system to transfer and/or acquire software and/or data from the monitoring device. The data taken or pulled from the monitoring device can be used to convert the data string to a report and/or any other suitable set of information that can be saved on a memory device, as a PDF file and/or any other suitable electronic file.

In some embodiments of this invention, reports, data and/or other information related to tooling activity at a particular company is manually and/or automatically saved to a memory device, such as a shared network drive or other similar device. In some embodiments of this invention, these reports, data and/or other information than can be communicated and/or copied to a file transfer protocol (FTP) site, making them accessible by or available to a processor of the OEM customer, for example. According to this invention, for example, an OEM in England can verify that its processor operating in Thailand is producing a required number of parts within the required timeframes, and verify that cycle times and/or tool maintenance is within targets.

In some embodiments, the monitoring device according to this invention can be used to overcome or eliminate the need for conventional methods for accessing or gathering reports, data and/or other information from an operating tool located at a remote location, for example, which may include a person physically traveling to the tool at the remote location, periodically, and gathering reports, data and/or other information. While at the remote location or even when the tool is transported to a tool room for service, the monitoring device of this invention can be connected with a device and/or software, to transfer reports, data and/or other information.

In some embodiments of this invention, the monitoring device comprises or has within memory of the monitoring device a unique identifier, such as a device identification ID number, for example, which can be similar to a vehicle identification number or VIN number. The unique identifier or number according to this invention can be electronically identified and/or otherwise permanently identified, such as laser etched on the face of the monitoring device in what is referred to as a "URL/Serial Number," for example "CVeMonitor.com/OGZ0011", so that a specific database record location can contain information, including tool drawings, processing setup sheets, maintenance activity reports, and the like, for the tool to which the monitoring device is mounted.

In some embodiments of this invention, although the launch operates to "connect" the OEM with the tool performance, some manual aspects can be further developed and/or automated.

BRIEF DESCRIPTION OF THE DRAWINGS

The features of this invention are described in more detail in the following specification, particularly when taken in view of the drawings, wherein:

FIG. 2 shows a diagrammatic view of a system showing apparatus and process features, according to one embodiment of this invention;

FIG. 3A shows an upper screenshot or dashboard window displaying a sample of many different parameters accessible through the screen display, according to one embodiment of this invention;

FIG. 3B shows a lower screenshot or dashboard window displaying a sample of many different parameters accesible through the screen display, according to one embodiment of this invention;

FIG. 5 shows a screenshot or window displaying a summary report showing different operating parameters related to a tool, according to one embodiment of this invention;

FIG. 7 shows a screenshot or window displaying information related to different operating parameters of a tool, according to another embodiment of this invention;

FIG. 8 shows a screenshot or window displaying information related to different operating parameters of a tool, according to still another embodiment of this invention;

FIG. 11 shows a perspective view of a base station with a cover installed and a cover uninstalled, according to one embodiment of this invention;

FIG. 12 shows a perspective view of a transmitter with a cover installed and a cover uninstalled, according to one embodiment of this invention;

FIG. 14 shows a screenshot or window displaying information about different operating parameters of a tool, according to one embodiment of this invention.

DESCRIPTION OF THE INVENTION

Figure 1:
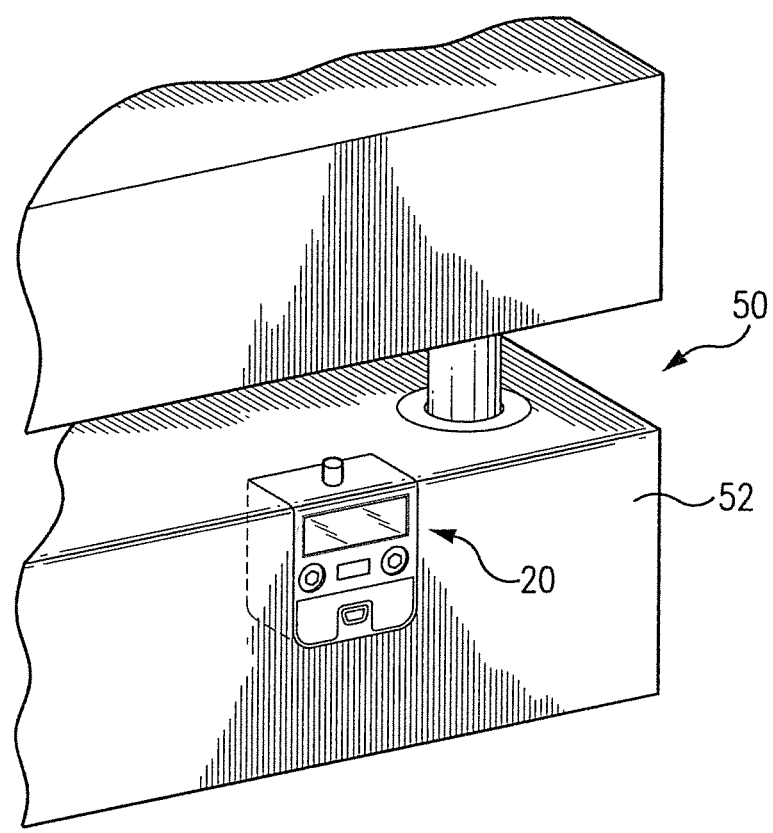
FIG. 1 shows a perspective view of a monitor for a monitoring device, mounted with respect to a tool that molds or stamps, according to one embodiment of this invention.
Figure 4:
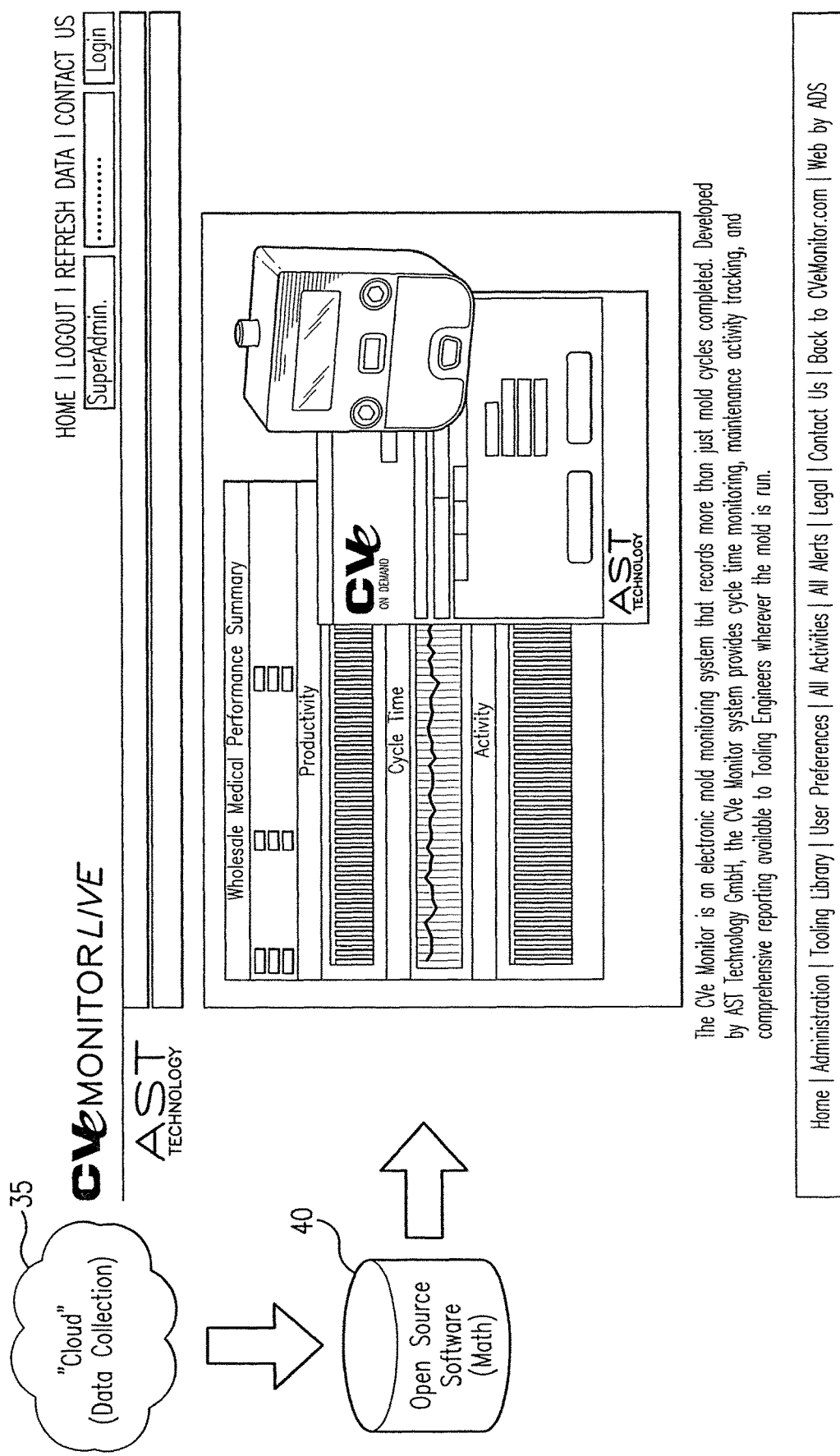
FIG. 4 shows a diagrammatic view, including a screenshot or window, of a system showing apparatus and process or method features, according to one embodiment of this invention.

FIG. 1 shows one embodiment of monitor 20 according to this invention. As used throughout this specification and in the claims, the terms monitoring device and monitor are intended to be interchangeable with each other and relate to a monitor or other similar device or apparatus that counts cycles and/or tracks other operating parameters and/or data associated with or corresponding to a production process, such as an injection molding process. United States Patent Application Publication US 2011/0316180 A1, the entire teachings of which are incorporated into this specification by reference thereto, describes different embodiments of tool monitoring devices that can be used, for example, as monitor 20 of this invention.

As used throughout this specification and in the claims, the terms tool, mold, stamping tool, die, stamping die, die casting die, reciprocating tool, and/or tooling and/or any other similar term known to those skilled in the industry are intended to be interchangeable with each other and to relate to any apparatus, device and/or system that makes, produces or otherwise results in a part, such as a produced part, including but not limited to a part made, produced or otherwise resulting from a relative movement between two apparatuses, devices and/or systems. For example, a relative movement between two apparatuses, devices and/or systems can be accomplished with any suitable forming method, including but not limited to injection molding, compression molding, transfer molding, vacuum forming, blow molding, pressure forming and/or any other similar type of forming known to those skilled in the industry.

FIG. 1 shows monitor 20 mounted directly to tool half 52. Monitor 20 can have any other suitable connection, attachment, securement, shape and/or dimensions and still accomplish the function of engaging with and counting cycles of tool 50 and/or gathering other data or information about the operating parameters of tool 50. In some embodiments of this invention, the end user of tool 50 may select the particular design, style and/or model of monitor 20.

In some embodiments according to this invention, monitor 20 comprises transmitter 32, such as shown in FIG. 12. In certain embodiments of this invention, transmitter 32 is relatively small or is otherwise appropriately sized so that transmitter 32 can be mounted to a top of the tooling or stamping press 34, as shown in FIG. 2. In some embodiments of this invention, cable 33 and/or any other suitable connector can be used to maintain a connection and/or communication with monitor 20 and/or to the tooling or stamping press, to gather additional processing data. Multiple transmitters 32 can be positioned or, otherwise located within or throughout an operating plant or facility and can transmit, emit, send or otherwise communicate a signal to base station 30, such as shown in FIG. 11, which can be positioned or located in a local, a central and/or a remote position or location within the facility. In some embodiments of this invention, transmitter 32 can be supplemented with or replaced by any other suitable device that can be used to transmit signals, with a wired connection and/or a wireless connection.

Referring to FIG. 2, in some embodiments of this invention, monitor 20 can communicate an output signal directly to Cloud 35, processor 40, window 45 and/or any other device, system and/or element that can display information.

In some embodiments of this invention, an updated version of monitor 20 can be acceptable for stamping die conditions. Also, it is possible for monitor 20 of this invention to apply to other tooling technologies, such as blow mold thermal forming, extrusion and the like. Die Cast facilities and/or environments may require the use of a significantly different approach, for example, possibly mechanical or mechanical on-mark, linked to a signal generator, prior to or before transmitter 32.

In some embodiments of this invention, such as shown in FIG. 2, base station 30 communicates, transmits and/or sends a signal to a local processor and/or a remote processor and/or processing station, such as a computer, a processor or another similar processing and/or transmission device, including but not limited to "The Cloud". The Cloud can be any suitable infrastructure, such as a complex infrastructure, for example containing systems that enable The Cloud computing that can be used to entrust suitable remote services with particular data, software and/or computations of a user. In some embodiments of this invention, base station 30 and/or transmitter 32 is not connected to a computer, processor, PC or other similar processing and/or transmission device and may not be connected to a processor network but may communicate, in a wired manner and/or a wireless manner, directly to The Cloud and/or any other device, system and/or element that can display information.

Referring to FIG. 2, Cloud 35 and/or another similar infrastructure of systems can receive information continuously, constantly and/or intermittently from all running or operating tools, each of which is capable of sending data to Cloud 35, such as through base station 30 at specified times and/or time intervals, for example each 10 seconds. Although the data string itself can be relatively small for some embodiments of this invention, for example approximately 15 fields, collectively over a period of time this can be an enormous amount of data transmitted to or coming to Cloud 35.

Referring to FIG. 2, with the system according to this invention, a customer, for example an OEM, can monitor or watch production activity without being physically positioned at the location of each monitor 20. For example, the OEM can have several different tools 50 operating in different locations throughout the world and without traveling to each location can watch performance parameters and other operating conditions from a central location, which can help the OEM be assured of preventative maintenance activities and also use this information for verifying a supply of end product goods to the marketplace.

As shown in FIG. 2, monitor 20 has cable 33 connected between transmitter 32 and monitor 20 to form electrical communication between monitor and/or press 20 and transmitter 32. In other embodiments according to this invention, cable 33 can be supplemented with or replaced by any other suitable wired connection and/or wireless connection. For example, Bluetooth technology or any similar protocol can be used to wirelessly communicate information between monitor 20, transmitter 32 and/or base station 30.

In some embodiments of this invention, monitor 20 communicates real-time operating information about tool 50. For example, United States Patent Application Publication US 2011/0316180 A1 describes some of the features of monitor 20 according to this invention, but monitor 20 is not limited to those features and can have other and/or different features suitable for the production industry.

Referring to FIG. 2, according to some embodiments of this invention, data or other information is communicated and/or transferred, for example at determined time periods or during periodic time intervals, to transmitter 32. In some embodiments according to this invention, each monitor 20 has a corresponding transmitter 32 positioned locally with respect to the corresponding monitor 20. In other embodiments according to this invention, a plurality of monitors 20 can correspond to one transmitter 32. Many processors have several, sometimes hundreds of tooling machines operating in one structure or facility.

In some embodiments of this invention, transmitter 32 communicates or otherwise transfers data or other information to base station 30. As shown in FIG. 2, there is only one base station 30. However, in other embodiments of this invention, the system can comprise two or more base stations 30 located throughout one facility. As shown in FIG. 2, data or other information is communicated wirelessly from each transmitter 32 to the corresponding base station 30. In other embodiments of this invention, any suitable wired connection can be used in addition to or in place of the wireless communication shown in FIG. 2.

Referring to FIG. 2, each base station 30, which in some embodiments can be a gateway product, communicates the data or other information from base station 30 to Cloud 35. In some embodiments of this invention, Cloud 35 can then communicate or otherwise transmit the data or other information to processor 40. Processor 40 can manipulate, calculate, summarize, perform arithmetic and/or any other mathematical function and/or algorithm to the data or other information and derive and/or calculate different parameters which can be communicated to and displayed in window 45, for example. In some embodiments of this invention, window 45 displays the processed tool data as a desired result in a graphical user interface and window 45 is of a device that is positioned and/or located remotely or in a remote location with respect to monitor 20.

As used throughout this specification and in the claims, the terms window, dashboard, graphical user interface, display, tool listing window, personal computer, tablet device, tablet, phone device and/or phone and/or any other similar term known to those skilled in the industry are intended to be interchangeable with each other and to relate to any apparatus, device and/or system that allows a user to interface with and/or interact with any suitable electronic device or other type of device that uses and/or displays an image.

In some embodiments of this invention, window 45 communicates with processor 40 and/or any other suitable processing device and/or memory device that can be used to allow the user to retrieve and/or display any suitable stored information, for example, a PDF file and/or any other suitable electronic file and/or other file used to access and/or furnish information or other data, including but not limited to tool drawings, set up sheets, maintenance instructions, diagrams and/or any other similar information or other data known to those skilled in the industry.

In some embodiments of this invention, processor 40 comprises any suitable hardware and/or software that can accept or receive volumes of data or other information and calculate and/or process the data or other information into desired results and/or products by applying any one or more algorithms and/or functions, such as mathematical functions, arithmetic functions and/or any other technical functions, necessary to send or emit a desired result or results that can be further processed and/or displayed as a final result or a conclusion. In some embodiments of this invention, the desired result, the final result and/or the conclusion can be communicated or otherwise transferred to window 45, so that an end user can view information communicated through monitor 20 which contains, for example, operating information and/or other technical information about or regarding tool 50.

Depending upon the particular information and/or other technical information communicated by monitor 20, according to different embodiments of this invention, different types of users or end users are interested in or allowed to view or receive specific information and/or summary information about tool 50, for example, which is communicated by monitor 20. In some embodiments of this invention, the user or end user may be an owner such as an OEM, a processor and/or a tool maker.

As used throughout this specification and in the claims, the terms owner, original equipment manufacturer (OEM) and/or contract manufacturer and/or any other similar term known to those skilled in the industry are intended to be interchangeable with each other and to relate to any entity that manufactures and/or sells goods in the marketplace.

In some embodiments of this invention, the OEM or other owner buys or purchases tool 50 and thus typically owns the tool and the associated information about the tool. Thus, in some embodiments according to this invention, the owner has access to and thus views or sees all information, including technical and/or operating information, about each tool 50 owned by the owner, for example, which can be communicated through monitor 20 of this invention. In some embodiments of this invention, by displaying data, information and/or desired results through window 45, the owner can review detailed reports and/or summary reports. The desired results displayed through window 45 can include, for example: a listing of all monitors 20 and thus tools 50 of the owner; a number of different groups of products being molded through each tool 50; the specific location of each monitor 20 and thus tool 50; operating reports which may include cycle times, short-term run times, long-term run times, life-to-date run times, and/or any other suitable performance parameter; press data such as molding pressures and parameters; technical information about tool 50 and/or any other suitable part or component of tool 50; and information necessary to render informed preventive maintenance decisions and take preventive maintenance actions. In some embodiments of this invention, window 45 is passive and only provides information to the end user. In other embodiments of this invention, window 45 is passive and active and thus in addition to providing information also allows the end user to enter commands to manipulate the information and/or to communicate orders through window 45.

As used throughout this specification and in the claims, the terms molder and processor and/or any other similar term known to those skilled in the industry are intended to be interchangeable with each other and to relate to any entity that produces, manufactures and/or sells parts and/or pieces, for example, to the OEM or other owner.

In some embodiments according to this invention, the user or end user is referred to as a processor, for example, which can be a company or other party that molds or stamps specific products or parts, typically for the owner or the OEM. In some embodiments of this invention, the processor can have access to the same information as the OEM, but the tool maker can have less or more limited access to the same information as the OEM. For example, the OEM may not want the tool maker to have access to any proprietary or confidential information, or process information, but may want the tool maker to have access to PM records. In some embodiments according to this invention, the processor may be able to view through window 45 information including: operating data for a particular tool 50; operating and/or performance data on each and every tool 50 at the operating facility of the processor; technical data, such as process sheets and/or other documents related to a particular tool 50; technical drawings and/or other technical information about a particular tool 50; and data or other information as it relates to preventive maintenance on each tool 50, such as at the operating facility of the processor.

As used throughout this specification and in the claims, the terms mold maker and tool maker and/or any other similar term known to those skilled in the industry are intended to be interchangeable with each other and to relate to any entity that designs, builds and/or supplies molds or tools that are used to produce and/or manufacture parts and/or pieces, for example, for the OEM or other owner.

In some embodiments according to this invention, the user or end user is referred to as a tool maker, for example, which can be a company or other party that designs and/or builds tools or parts for molds, and typically supplies the tool or tool parts to the owner, such as the OEM, or to a processor that has a contractual or other working business relationship with the owner. In some embodiments of this invention, the tool maker can have access to the same information or desired results as the owner and/or the processor but also can have less or more limited access to the same information or desired results as the owner and/or the processor. For example, the owner may not want the tool maker to have access to any proprietary or confidential information. In some embodiments according to this invention, the processor may be able to view through window 45 information including: data and/or information necessary to install and/or activate monitor 20 of this invention, such as installed in a particular tool 50; technical data, such as process sheets and/or other documents related to a particular tool 50, particularly that would enable the tool maker to understand requirements of the owner so that the tool maker could design and build a particular tool 50.

Because the different users or end users that view and/or supply or furnish information, such as through window 45, may have different roles as related to each tool 50, the different users or end users may have different levels of security to clear before having access to any information available, such as through window 45. In some embodiments according to this invention, each different role may require a different password and/or other security clearance or measure to clear before having access to data, information and/or results accessible, such as through window 45, according to the apparatus and method or process of this invention.

Figure 3A:
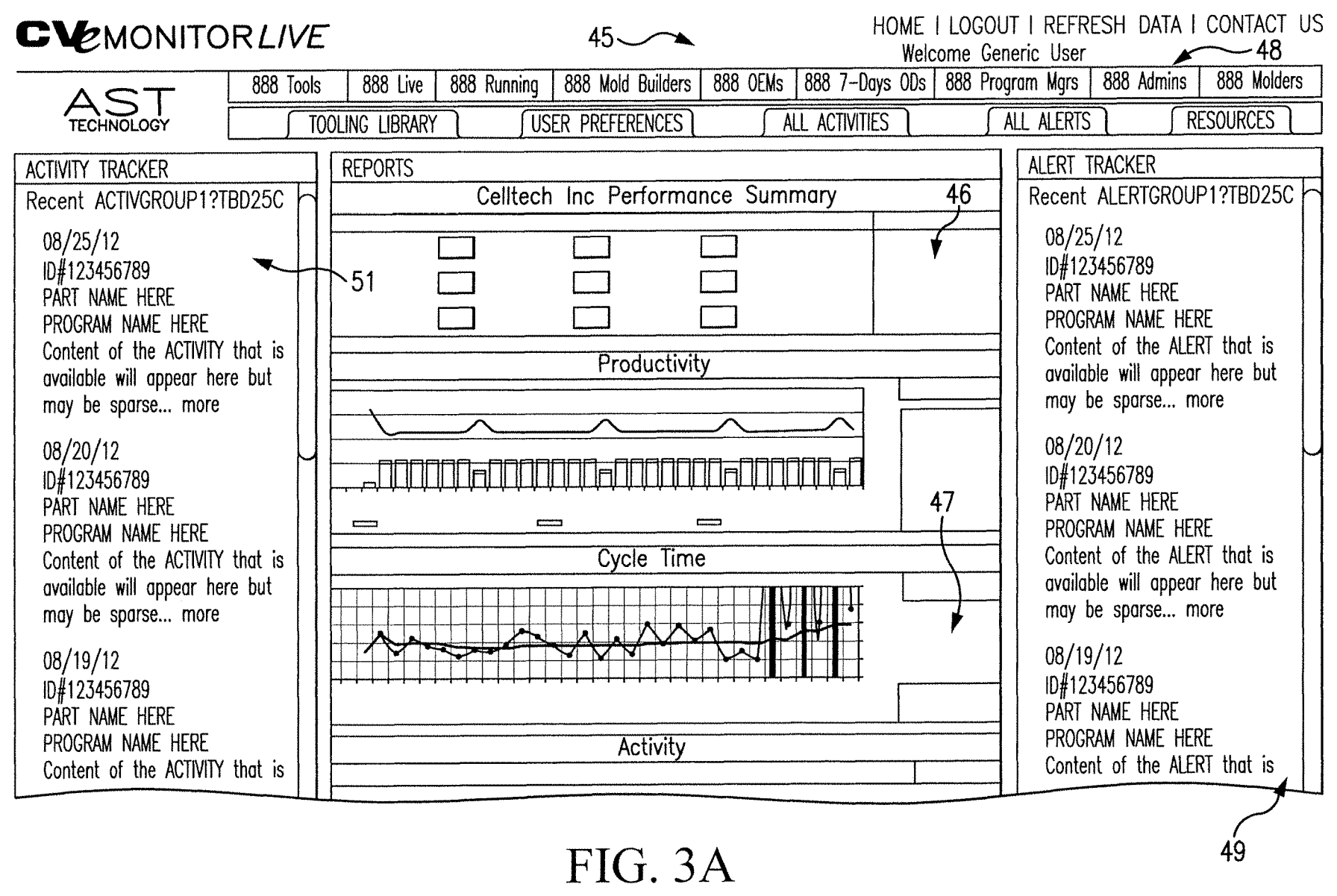
Figure 3B:
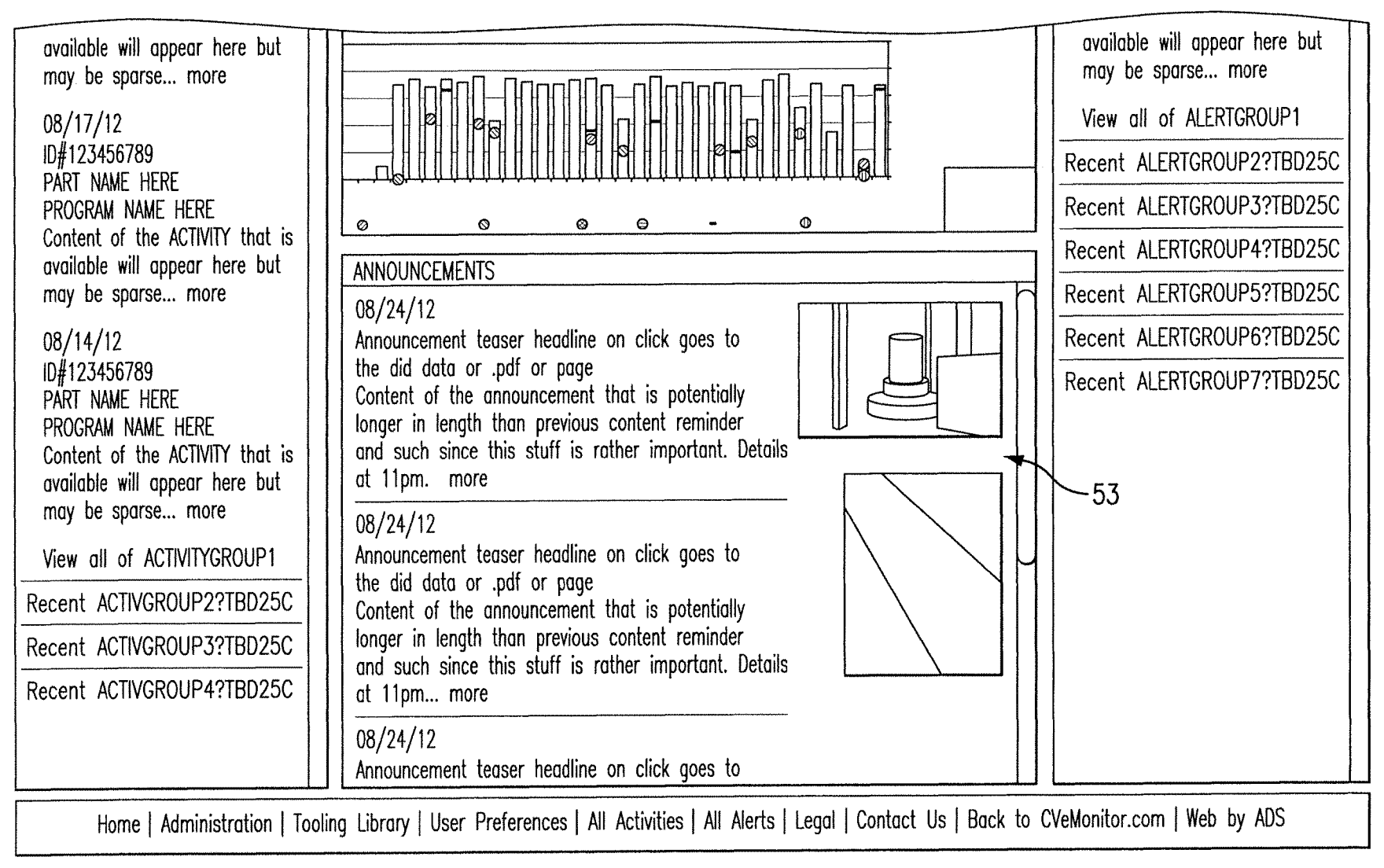

FIG. 3 shows one embodiment of data, information and/or results accessible through window 45, which may or may not be referred to as a dashboard or a dashboard window. In some embodiments of this invention, the OEM has access to all information displayed in the dashboard of window 45. In some embodiments, the dashboard shows all or any selected group or portion of tools, for example, as operated for the corresponding OEM throughout one or more locations, which can be in any specific country or can be worldwide. In some embodiments according to this invention, the OEM can act as an administrator, for example, to control which information is provided to any other user and/or to authorize any other user access to any portion or all of the data, information and/or results.

As shown in FIG. 3, in some embodiments of this invention, area 46 of window 45 can be used to display statistics or other global or summary information, for example, to provide the end user with a quick reference for summary information. For example, any global or summary information may include how many molding tools are in a particular database, how many tools 50 are running at one particular time or time period, that information is being sent to Cloud 35, the number of processors, the number of administrators, the number of managers, other information from a database used to store information on any one or more tools 50, and/or whether any one or more tools 50 is in a running mode or a sleep mode.

Figure 8:
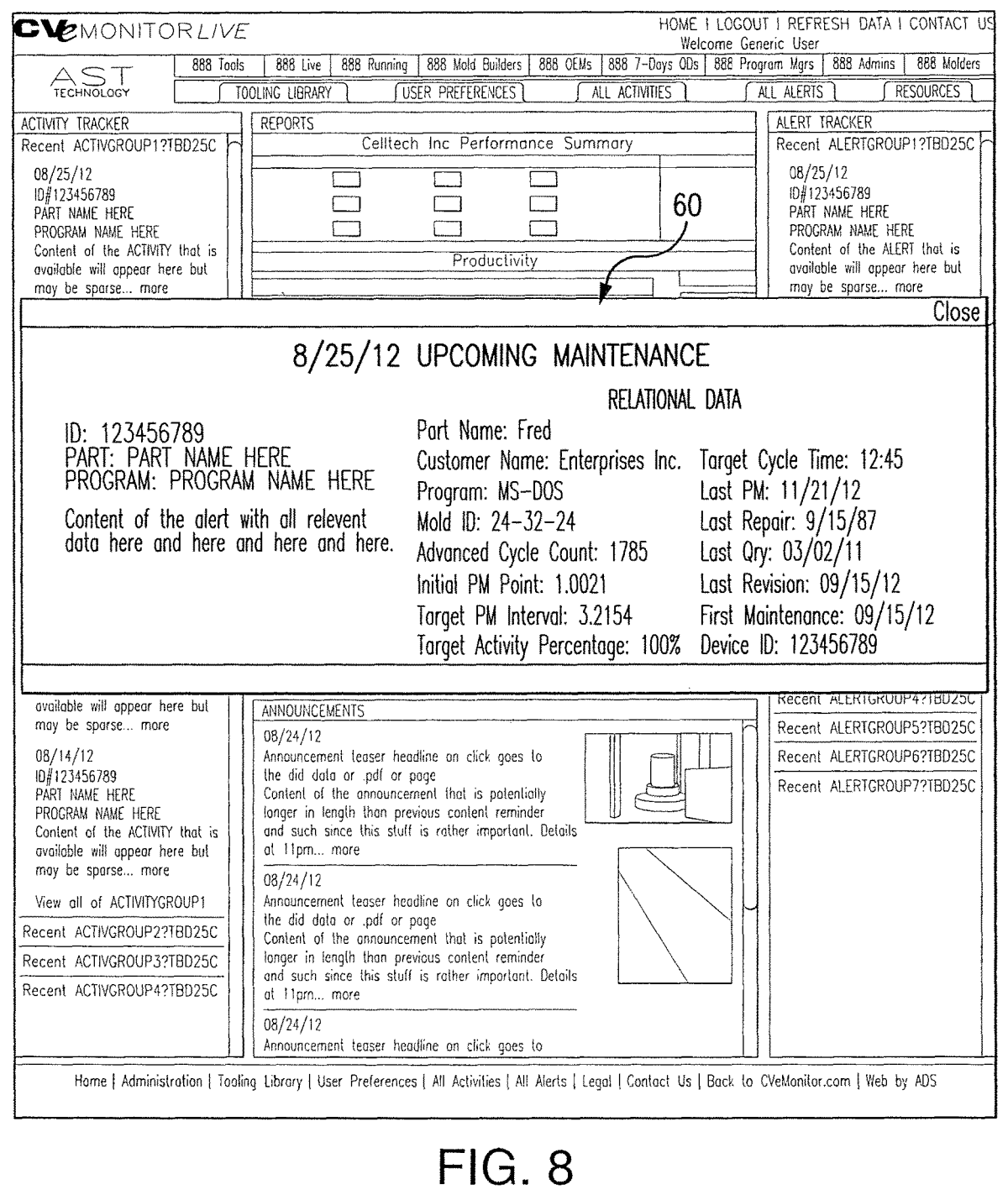

As shown in FIG. 3, in some embodiments of this invention, area 49 of window 45 can be used to display any types of alerts and/or alarms for operating and/or maintaining any one or more tools 50. For example, if tool 50 at any one or more locations is running at a certain percentage above a targeted cycle time, an alarm and/or alert can be communicated or otherwise sent to the end user, for example, the owner or the OEM. FIG. 8 shows one embodiment of window 60 that can be used to provide an alarm and/or an alert. In some embodiments of this invention, the alarm and/or the alert can communicate that it is time, whether due or overdue, for maintenance, such as any preventive maintenance activity.

In different embodiments of this invention, hyperlinks can be used in any one or more of Windows 45, 55, 56 and/or 60, to allow the end user to see further information and/or levels of detail.

In some embodiments of this invention, such as shown in FIG. 3, area 46 of window 45 can display a tool listing, for example, showing any one or more tools 50 that the owner as running or operating in manufacturing facilities anywhere in the world. FIG. 5 shows one embodiment of window 56, for example, which may or may not be a sub window of window 45, which displays information entered automatically and/or manually, for example, the identity of the processor, the identity of the tool maker, the identity of the owner, the geographical location of the tool and/or any other suitable information desired by the owner.

Figure 6:
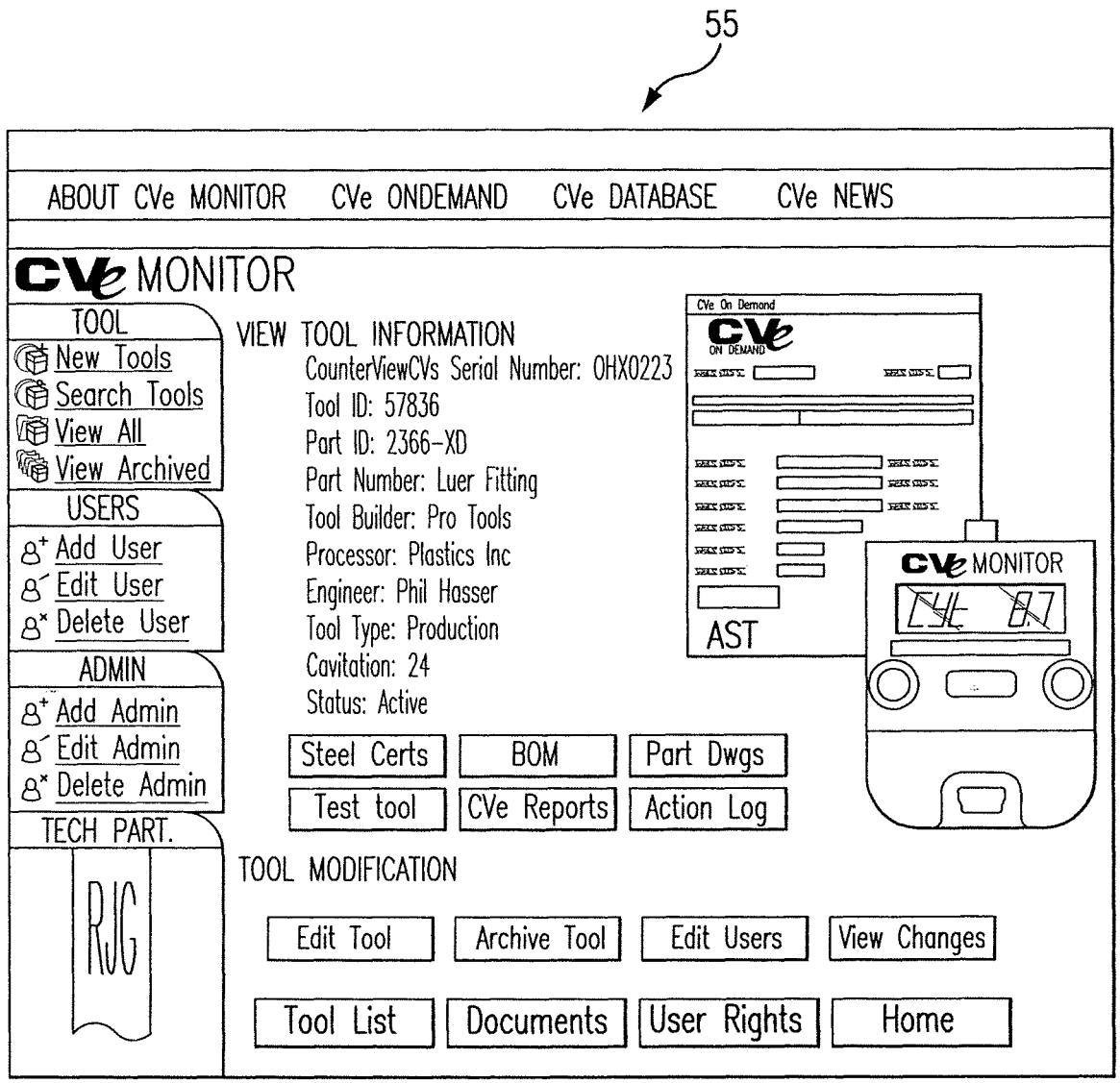
FIG. 6 shows a screenshot or window displaying information related to different operating parameters of a tool, according to one embodiment of this invention.
Figure 9:
FIG. 9 shows a screenshot or window displaying information related to different operating parameters of a tool, according to still another embodiment of this invention.
Figure 10A:
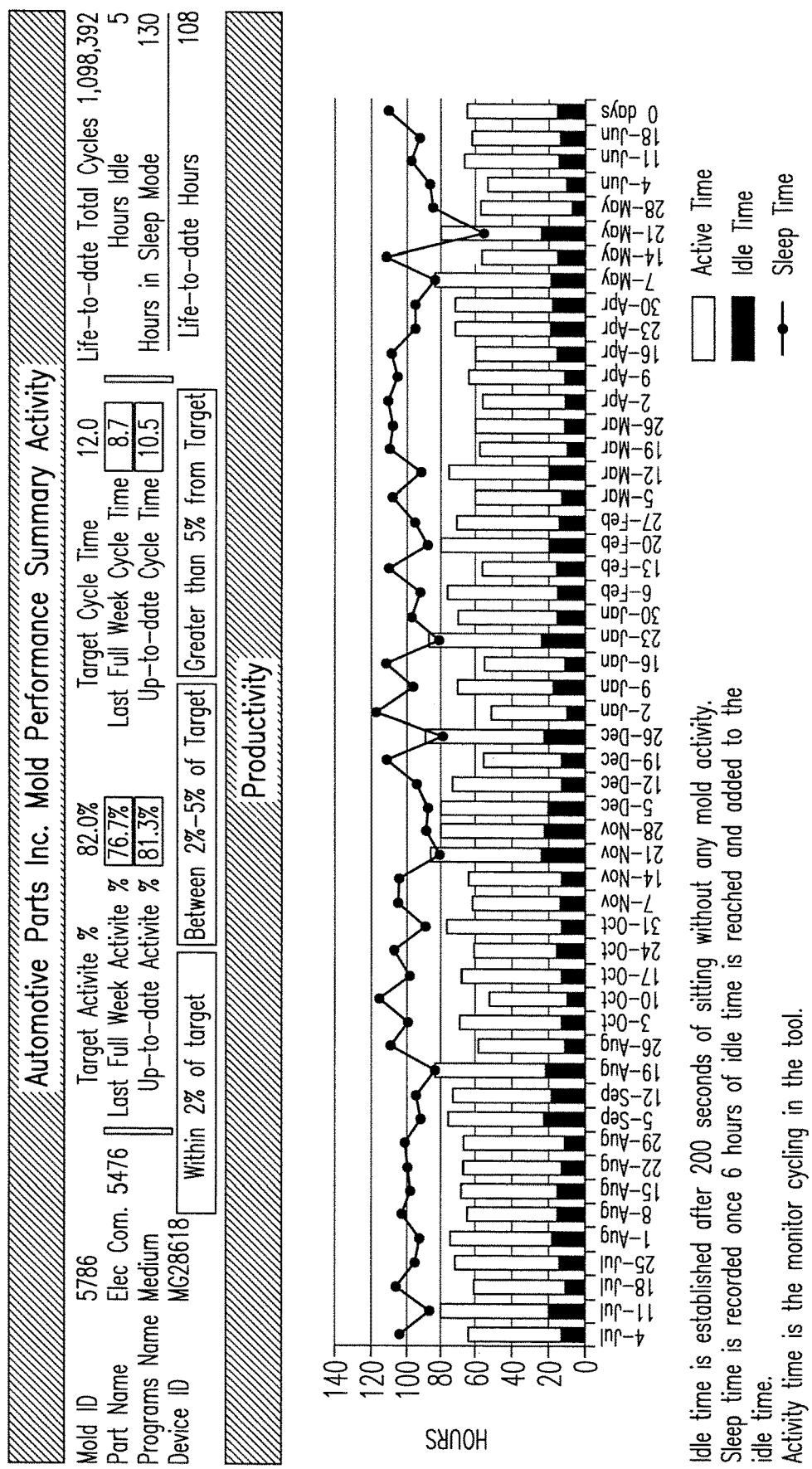
FIG. 10A shows an upper screenshot or window displaying summary information related to operating parameters of a tool, according to yet another embodiment of this invention.
Figure 10B:
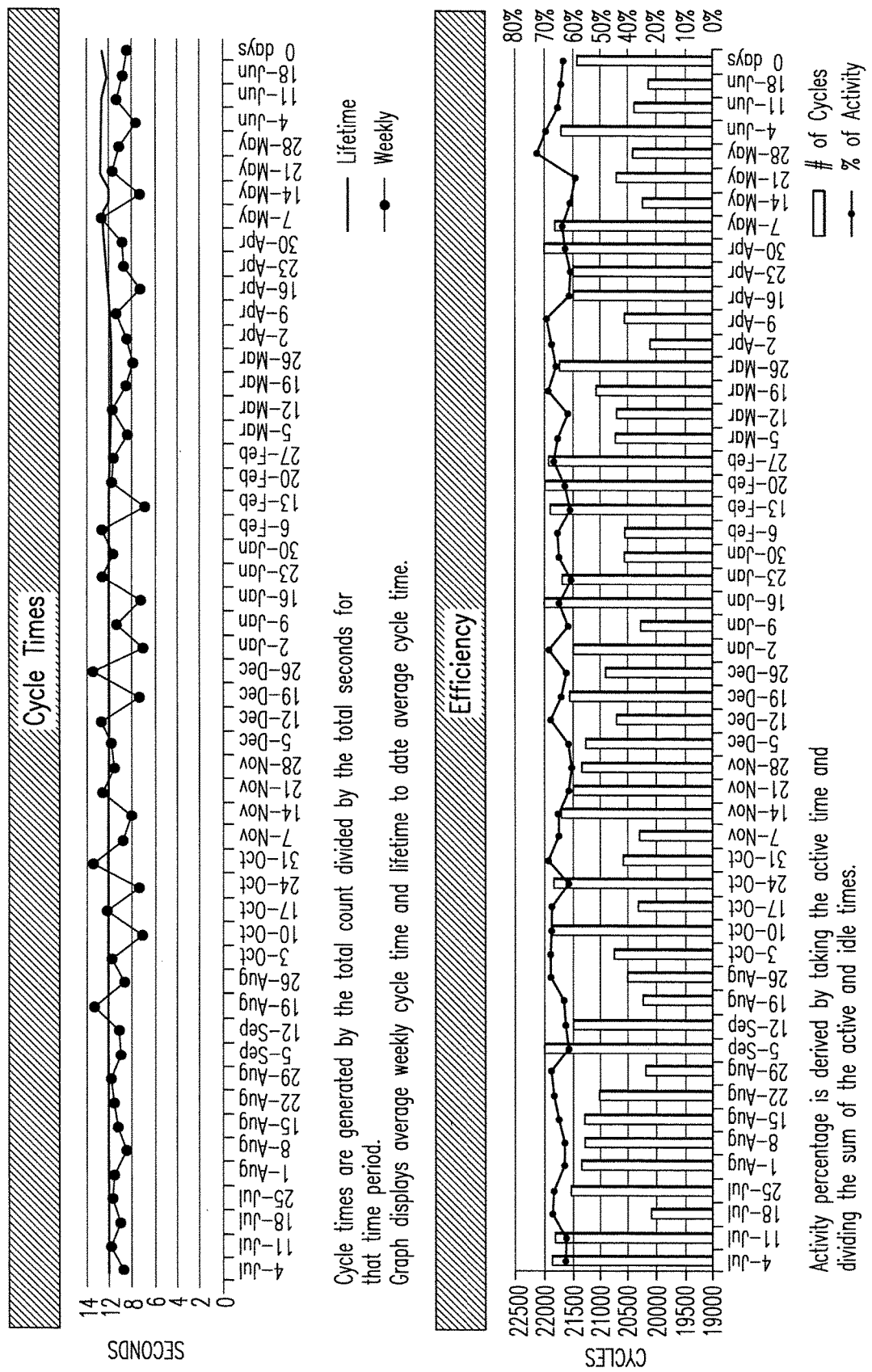
FIG. 10B shows a lower screenshot or window displaying summary information related to operating parameters of a tool, according to yet another embodiment of this invention.
Figure 13:
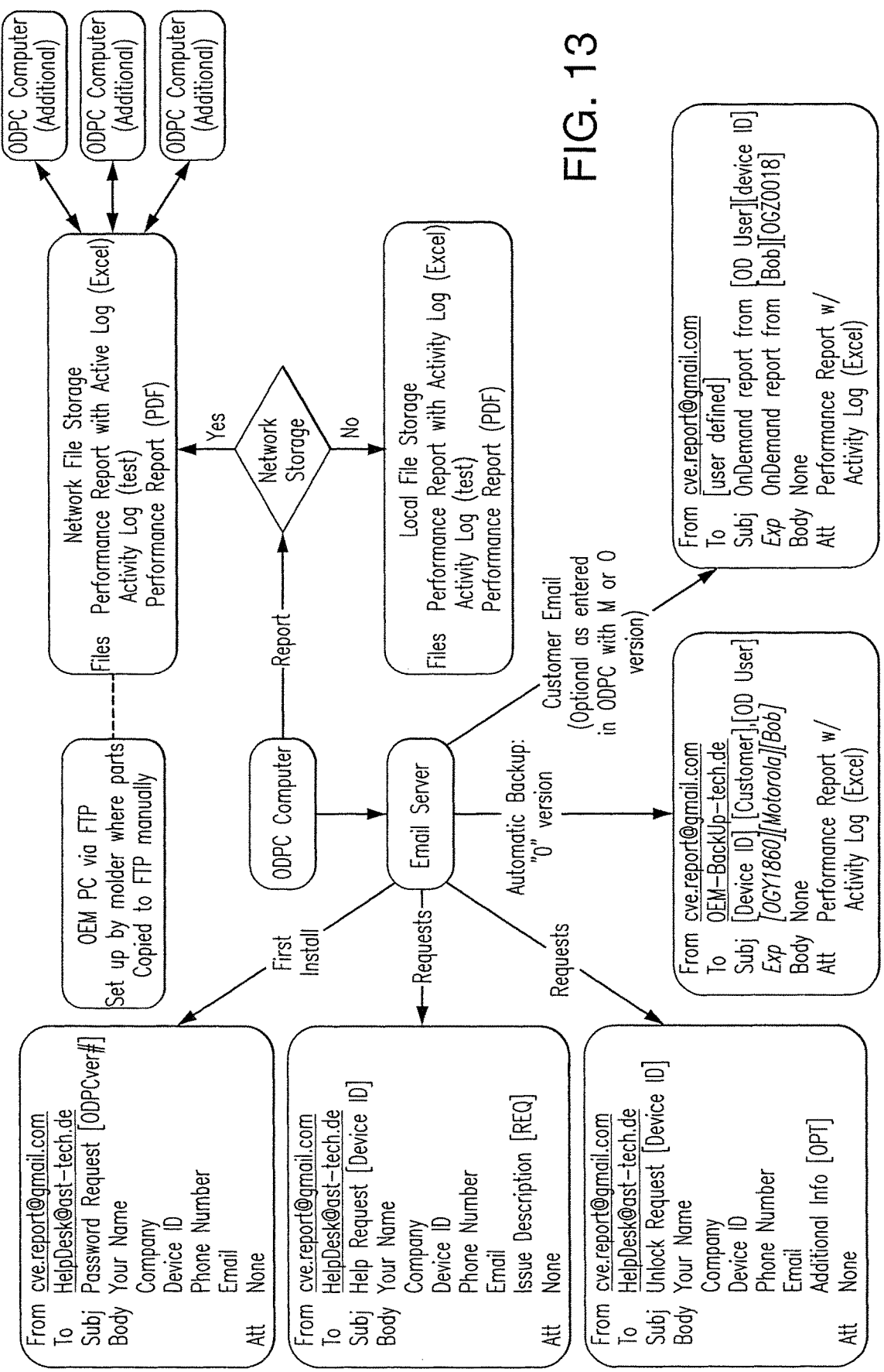
FIG. 13 shows a flowchart of a method for molding processes, according to one embodiment of this invention.

In some embodiments of this invention, such as shown in FIG. 3, area 47 of window 45 can display any one or more of different authorized operating parameters. For example, area 47 shown in FIG. 3 displays a graph of cycle times over a given time period. In some embodiments of this invention, after the particular operating parameter and/or data is selected, any one or more of several different types of reports can be generated, displayed, recorded and/or printed, for example. FIG. 6 shows window 55 that can be generated according to the system and process of this invention, to display results in a different manner.

In certain embodiments according to this invention, the end user can select to display, for example as shown in FIG. 7, one or more tools 50 as data or other information is communicated through monitors 20. The system and process of this invention can be used to group together two or more tools 50, for example, a group of tools 50 used to produce a product, such as a cup with mating parts. The end user can then analyze different performance and operating parameters of different tools 50. This type of analysis can be particularly useful to the end user that is trying to fulfill or meet a deadline date for completing manufacture of a product, or for assessing optimal times for attending to preventive maintenance programs for each tool 50 and/or any tool component of tool 50.

In different embodiments according to this invention, window 45 can be configured in any suitable manner. For example, window 45 can be configured as shown in FIG. 3 and/or can be otherwise rearranged, added to, deleted from and/or revised to provide similar information and/or different information that can be displayed, for example, through window 45 and/or another suitable display device.

As shown in FIG. 3, in some embodiments of this invention, area 51 of window 45 can be used to display an activity tracker, for example, to provide a current status of activities associated with the database, for example. Also as shown in FIG. 3, in some embodiments of this invention, area 52 of window 45 can be used to provide announcements and/or advertisements, including but not limited to activities related to the tooling industry.

As shown in FIG. 3, in some embodiments of this invention, area 53 of window 45 can be used to display information related to a tooling library, for example, which may comprise specifications and/or drawings associated with a particular tool and/or tool 50.

The OEM or other end user can select different operating parameters to display that any desired level of detail, such as a full information report and/or a summary report. The method and system of this invention can be used to effectively allow the OEM or other end user to monitor or watch information about one or more of the OEM's facilities without physically traveling to each facility. The OEM can then render informed business decisions to track production, monitor preventive maintenance and/or watch productivity of its processors, for example.

Progressive Components International Corporation, located in Wauconda, Ill., has sold a conventional mechanical counter under the trademark CounterView® CounterView for many years which has become a more commonly used counter for monitoring molding tool activities. Monitor 20 of this invention, in some embodiments, has materials and/or dimensions which are compatible with the CounterView® counter and can fit within the same machine pocket or void. However, monitor 20 according to this invention can acquire data and learn much more information about a molding tool and its operations by learning data and information about the operating parameters of a tool and then, for example, projecting or forecasting sales of devices similar to monitor 20 of this invention.

Cloud 35 or any other suitable memory device and/or infrastructure of systems can receive communicated data from monitor 20 of this invention, for example every 10 seconds or at any other suitable time period, can store or hold the data and subsequently can transmit, emit or send out the data, such as 24 of the selected data strings each hour or other specified time period.

In some embodiments according to this invention, a device and/or a location, for example where the data is transmitted, communicated and/or sent can be referred to as CVeMonitor.com or any other suitable address or location. In some embodiments of this invention, a database record comprises tool information, and this database record can be a destination for the data that contains a certain time period, such as 24 hours or any other suitable time period of the tool activity or activities. For example, when the user enters the database for a particular tool, the user can select an electronic file or any other suitable file, such as a "file drawer", that contains a category of information desired or being sought.

Conceptually, any suitable data string, such as a data string of 24×15 fields, can reside within a specified folder, memory and/or other storage device. Then, upon user selection, the data string or other stored information can be converted, such as mathematically or through any suitable algorithm, to a visual report, such as a PDF report. In some embodiments of this invention, the file can be unzipped or accessed by addressing a data warehouse. This user activated report creation can be used to manipulate, such as to reduce the overall database size.

In some embodiments of this invention, because of some OEM concerns for data security, configurability and/or manipulation can include storing or otherwise allowing all of the data corresponding to a particular OEM to reside on the server of that particular OEM, rather than another suitable provider of data storage and/or manipulation. In some embodiments according to this invention, depending upon the level of security required, there can be a different or separate higher level access which further enhances security, for example to integrate and train an OEM to house and manage any and/or all data owned by a particular OEM.

In some embodiments according to this invention, when monitor 20 is purchased or otherwise acquired by the tool maker, the tool maker identity, such as its company name is or can be tracked, and then an identifiable record or a running record is or can be maintained, such as for which device identification ID of a particular monitor 20 was purchased and by whom. If monitor 20 or another suitable device of this invention was specified by an OEM, in some embodiments of this invention an OEM's ID code is or can become part of a catalog number for monitor 20. In such embodiments, any specified monitor 20 contains a unique or different device ID code, which may be specific to a particular part identification and/or a particular tool identification, which can thus provide for or allow different reporting and backups to be made as compared to monitor 20 that is purchased by the processor or the tool maker for its own use. According to other embodiments of this invention, a particular OEM to which the monitor 20 corresponds is or can be maintained within a running record for later population into any suitable device and/or location, such as at CVeMonitor.com.

In some embodiments of this invention, when the processor accesses or connects monitor 20 or another suitable device or apparatus to a software package, such as during a report generation process, the report is communicated, transmitted and/or otherwise sent, such as e-mailed out or electronically sent to an e-mail address, such as of a provider. The e-mails or other data transmissions can serve as a backup of the tool performance data and also allow the provider or another suitable party to propose to a corresponding OEM customer services, such as consulting work to correct performance exceptions associated with monitor 20 and/or any other part of the tooling tool.

Comparable conventional tracking systems include manual systems in which the OEM can either access the data and/or information through the FTP Site or can be alerted about performance variances.

In some embodiments according to this invention, an automated system is configured to give an authorized user, such as a particular OEM, access to any portion or all of the stored information. In some embodiments, for each OEM, for example, a tool room manager and the tool room administration person can be provided or given administrative rights, which can be different and/or varied, to determine its preferred access configuration. For example, one OEM may provide their tooling engineers complete or all access to each others reports, yet may not share access with anyone outside of the company of the OEM, such as the tool maker and/or the processor. For example, another OEM might want its tooling engineer to have access to the particular OEM's tooling activity only, but not to other tooling programs. For example, access may still be provided to the tool maker or tool building company to only a portion or some of the information such as tool maintenance, but not to other information, such as tool cycle times. In certain embodiments according to this invention, a particular OEM may give or provide full access to the processor with a complete or full amount of information available on that particular tool to which monitor 20 corresponds.

In addition to configuring access for a myriad of preferences, for alerts it is possible to be similarly configured or determined by the user. For example, one OEM may be alerted by an e-mail or another similar communication, for example when adequate maintenance has not been performed on a particular tool at a particular determined time, and the alert may or may not be copied to the processor, and the tooling program manager. In another embodiment of this invention, another OEM may request a monthly summary report generated to that particular OEM, and to have an alert sent to the tool maker and the processor as well as the OEM's tooling program manager.

Although some embodiments of this invention relate to an OEM driven sale, in other embodiments, first contact with the first right to the information may not be the OEM. For example, in some instances, a tool builder or tool maker may be a decision maker for implementation and require his processor to perform maintenance at determined periods and synchronize with the software or other similar materials of a provider. For example, a tool maker in the United States can ship two tools to Mexico and, as part of the tool warranty, require maintenance and monitor 20 synchronization and also receive reports and be the administration for the record within CVeMonitor.com or another suitable device and/or software. In other embodiments according to this invention, there are different scenarios for contacting a manufacturer, such as where the contact OEM owns the first right to the information.

While a scenario of OEM/processor/tool maker has been described, at times a processor may specify the use of this system without the requirement coming from the OEM. Furthermore, the processor may perform the tool making function as well. In this scenario, the OEM may receive no information, and instead various personnel at the processor/tool maker would have access to various groupings of information that are pertinent to them.

Information has been thus far described as coming from the tool to the dashboard. However, information can pass the other way, from the dashboard to the device or monitor. This would allow new drawings, set up sheets, and maintenance instructions to be sent to the monitor. In some embodiments of this invention, such as shown in FIG. 2, the double-headed arrows between monitor 20, transmitter 32, base station 30, Cloud 35, processor 40 and/or window 55 indicate that communication between any one or more of those elements and/or any other elements of this invention can be a 2-way communication, for example, where data and/or information communicates by a wireless connection and/or a wired connection.

In some embodiments of this invention, reporting increments, data access, and alert recipients can be configured or is configurable to any particular preference of the user.

In some embodiments of this invention, reporting can simply be a hard copy report, such as a two-page PDF document on tool performance and activity. Additional reports can be developed that sum, total or collect data across numerous molding tools, for example to produce comprehensive charts for convenient comparison purposes.

In some embodiments of this invention, the reports can be geographically displayed. For example, one query may be "Tooling Engineer=Bob Smith, Maintenance Increments=10% or Greater variance and/or Cycle Times=10% variance" which could then display corresponding symbols on any suitable map or other similar document, which can provide information to help assess when a physical trip is required, for example for an individual or service person to make a plant or other site visit.

In some embodiments of a software package according to this invention, there is a basic recording of maintenance activity in an activity log. This maintenance feature or aspect can be expanded upon either from within CVeMonitor.com or another suitable device or location, or even through a separate interconnected module such as currently available through MoldTrax.com, for example.

In some embodiments of this invention, a company and/or a provider can have a dialog with companies that provide process monitoring systems. In some embodiments of this invention, a process monitoring systems process can be connected with monitor 20, for example. This can identify to the process monitoring system which mold is in which molding tool and at what time, as opposed to or rather than a current manual system that has no electronic communication and/or "handshaking". Because many conventional systems lack in capturing tool and/or other tooling data, CVeMonitoring.com or another suitable device or software package according to this invention could communicate and/or "connect" with a current system or pre-existing system in some manner. In some embodiments of this invention, if an OEM's supply chain is managed with an ERP system, for example, some connection to that system could be advantageous.

In some embodiments according to this invention, a company or other provider can sell transducers which gather processor information in real time from the tool and thus act as or be like a "file drawer" or electronic file within monitor 20, for example, for a tool set-up sheet as well as to allow for the tool set-up sheet that can be within CVeMonitor.com or another device or software program, to also be saved to a memory device, such as a flash drive or other storage device within monitor 20. It may also be possible for a company or other provider to remotely update set-up sheets for its customer, not only within CVemonitor.com or another device or software program, but on the device itself. In some embodiments of this invention, for a relatively large user base it may be beneficial to work with the users during the initial development and release, for example, to set precedent for similar future alliances with other companies.

Initially, it is envisioned that a particular company or provider would have the right to view all information throughout the entire database. However, in other embodiments according to this invention, OEMs may not allow access to some sensitive or proprietary aspects of their business, such as parts drawings. In this case, a particular company or provider could still retain access to and thus visibility for a significant portion of the tool information content.

In certain embodiments according to this invention, some particular parties could have rights only to specific OEM's general activity. For example, if a sales party signed up an automotive OEM, they may not have access to the product geometry of any particular part owned by that OEM. In some embodiments, the particular sale party could, however, have access to and thus know the total number of tools purchased, and in which countries. This particular information and/or access may not be within a given website but rather a program that serves the OEM's operations in order fulfillment of the OEM's global distributor and/or representative network. In some embodiments of this invention, additional information can be provided to the distributors, for example, if the tool is continuing to cycle and general alerts are communicated, for example, to get the OEM to request and/or receive services from the particular party, such as tool and/or mold tooling consulting services.

In some embodiments according to this invention, there may be different levels of users, for example, where a relatively small company can access the system of this invention at no charge and utilize it for basic needs. However, certain OEM installations may require a service agreement for ongoing contract management, training, and the like.

In some embodiments of this invention, because a user base could be developed, regular communications, for example an E-Newsletter, could be sent. Also, there can be a monitored "bulletin board" where best practices can be shared among peers, for example on the main screen of monitor 20. In some embodiments of this invention, because the website is an application that would be constantly displayed or "up" on their computer, the system of this invention can provide for promotion of webinars, for example by technology partners, and/or at upcoming trade shows are meetings, or for advertisements.

In some embodiments of this invention, if advertisements are not desired within the window or dashboard, then pertinent updates can be given to a technical user base, with preferences to a particular party, for example to form a somewhat central point for the manufacturing community.

While in the foregoing detailed description this invention has been described in relation to certain preferred embodiments thereof, and many details have been set forth for purposes of illustration, it will be apparent to those skilled in the art that this invention is susceptible to additional embodiments and that certain of the details described herein can be varied considerably without departing from the basic principles of this invention.

The entire teachings of each and every one of U.S. patent application Ser. No. 13/115,197, which was filed on 25 May 2011, of U.S. patent application Ser. No. 12/818,684, which was filed on 18 Jun. 2010, of U.S. Provisional Patent Application No. 61/268,957, which was filed on 18 Jun. 2009, and of U.S. Provisional Patent Application No. 61/545,394, which was filed on 10 Oct. 2011, are incorporated into this Specification by reference.

What is claimed is:

1. A system for displaying processed data from molds of an owner in presses of a molder, the system comprising:
a plurality of monitors controlled by the owner, each of the plurality of monitors configured to mount to a corresponding mold, the each of the plurality of monitors including a processor and an internal memory connected to the processor, wherein the each of the plurality of monitors records data from the corresponding mold and the processor converts the data from input data to output data comprising at least one of operating information of the mold, maintenance information of the mold, performance of the mold, and/or activity of the mold;

the each of the plurality of monitors comprising a transmitter, wherein the transmitter communicates the output data via a wireless transmission by the transmitter; and a base station in combination with the plurality of monitors, wherein the transmitter of the each of the plurality of monitors communicates the output data via a wireless transmission to the base station, and the base station communicates over a network to a data processor remotely located with respect to the base station and the plurality of monitors, wherein the owner has access to the output data via the data processor.

2. The system of claim 1, further comprising a second plurality of monitors controlled by the owner and a second base station in a location remote and different from the plurality of monitors and the data processor, wherein the second base station communicates over the network to the data processor.

3. The system of claim 1, wherein the data processor is remote from the owner and the owner accesses the data processor over the network.

4. The system of claim 3, further comprising a graphical user interface comprising at least a portion of the output data, wherein the data processor analyzes the output data and manipulates the output data into displayed data within the graphical user interface accessible by the owner via the network.

5. The system of claim 4, wherein the displayed data comprises operating information of the plurality of monitors, wherein the operating information comprises cycle counts from the each of the plurality of monitors, and the each of the plurality of monitors also displays a corresponding cycle count thereon.

6. The system of claim 5, wherein the displayed data comprises technical information of the plurality of monitors.

7. The system of claim 3, wherein the data processor provides all of the displayed data to the owner through a first graphical user interface, and a predetermined selection of less than all of the displayed data to the molder through a second graphical user interface.

8. The system of claim 7, wherein the less than all of the output data comprises preventative maintenance data, and does not include data predetermined as proprietary or confidential to the owner.

9. The system of claim 8, wherein the first graphical user interface provides an alert if the molder runs the molds without proper maintenance and/or at a predetermined percentage above a targeted cycle time.

10. The system of claim 8, wherein the proprietary or confidential information comprises drawings of the part produced by the mold.

11. The system of claim 8, wherein the proprietary or confidential comprises indication of monitors running at one particular time or time period and/or a representation of cycle times over a given time period.

12. The system of claim 8, wherein the data processor provides the less than all of the output data to a mold maker of the mold through the second graphical user interface.

13. The system of claim 7, wherein the first graphical user interface comprises a first password, and the second graphical user interface comprises a second password that is different from the first password.

14. The system of claim 7, wherein the second graphical user interface displays only portions of the first graphical user interface.

15. The system of claim 14, wherein the first graphical user interface includes data for the plurality of monitors for the corresponding molds of the molder and data for a second plurality of monitors of further molds of a second molder who is different from the molder, and the second graphical user interface includes data for the molds of the molder and not data for the further molds of the second molder.

16. The system of claim 7, wherein the first graphical user interface summarizes molding operation for a plurality of different molders, including which molders are running molds at a particular time period.

17. The system of claim 16, wherein the first graphical user interface provides an alert for any of the plurality of different molders running molds at a predetermined percentage above a targeted cycle time.

18. The system of claim 1, wherein each of the processor and the graphical user interface is controlled by a manufacturer of the plurality of monitors and access provided to the owner though the graphical user interface.

19. A system for displaying processed data from molds of an owner in presses of a molder, the system comprising:
a plurality of monitors controlled by the owner, each of the plurality of monitors configured to mount to a corresponding mold, the each of the plurality of monitors including a processor and an internal memory connected to the processor, wherein the each of the plurality of monitors records data from the corresponding mold and the processor converts the data from input data to output data comprising at least one of operating information of the mold, maintenance information of the mold, performance of the mold, and/or activity of the mold;
the each of the plurality of monitors comprising a transmitter, wherein the transmitter communicates the output data via a wireless transmission by the transmitter; and
a base station in combination with the plurality of monitors, wherein the transmitter of the each of the plurality of monitors communicates the output data via a wireless transmission to the base station, and the base station communicates over a network to a data processor remotely located with respect to the base station and the plurality of monitors, wherein the owner has access to the output data via the data processor; and
a graphical user interface comprising at least a portion of the output data, wherein the data processor analyzes the output data and manipulates the output data into displayed data within the graphical user interface accessible by the owner via the network;
wherein the displayed data includes a representation of cycle times over a given time period.

20. The system of claim 19, wherein the graphical user interface is accessible to the owner, and further comprising:
a second graphical user interface accessible to the molder, wherein the second graphical user interface includes tool maintenance information, and does not include and display the representation of cycle times.

21. A system for displaying processed data from molds of an owner in presses of molders, the system comprising:
a first plurality of monitors controlled by the owner and located in a first facility of a first molder;
a second plurality of monitors controlled by the owner and located in a second facility of a second molder at a different location from the first facility;
each monitor of the first and second plurality of monitors configured to mount to a corresponding mold, the each monitor including a transmitter, a processor and an internal memory connected to the processor, wherein the each monitor records data from the corresponding mold and the processor converts the data from input data to output data comprising at least one of operating information of the corresponding mold, maintenance information of the corresponding mold, performance of the corresponding mold, and/or activity of the corresponding mold, wherein the transmitter communicates the output data via a wireless transmission by the transmitter;

a server location remote from the first facility and the second facility;

a first base station at the first facility and in combination with the first plurality of monitors, wherein the transmitter of each of the first plurality of monitors communicates the output data via a wireless transmission to the first base station, and the first base station communicates over a network to a data processor at the server location;

a second base station at the second facility and in combination with the second plurality of monitors, wherein the transmitter of each of the second plurality of monitors communicates the output data via a wireless transmission to the second base station, and the second base station communicates over the network to the data processor at the server location;

a graphical user interface accessible to the owner via the data processor, the graphical user interface comprising at least a portion of the output data as displayed data.

* * * * *